United States Patent
Hamai (10) Patent No.: US 6,654,989 B2
(45) Date of Patent: Dec. 2, 2003

(54) SYNTHETIC RESIN ATTACHMENT FOR CLOTHES AND BELONGINGS

(75) Inventor: Noritsugu Hamai, Kanagawa-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/166,681

(22) Filed: Jun. 12, 2002

(65) Prior Publication Data

US 2002/0194708 A1 Dec. 26, 2002

(30) Foreign Application Priority Data

Jun. 25, 2001 (JP) .................................. 2001-191064

(51) Int. Cl.[7] .......................... A44B 13/00; A44B 19/30; A44B 11/00; B32B 27/00
(52) U.S. Cl. .......................... 24/429; 24/38; 24/418; 24/419; 24/432; 24/437; 442/93; 442/110; 442/383
(58) Field of Search .............................. 24/1, 38, 399, 24/400, 419, 429, 437; 198/844.2; 442/110; 252/8.63

(56) References Cited

U.S. PATENT DOCUMENTS

| | | | | |
|---|---|---|---|---|
| 2,891,878 A | * | 6/1959 | Chamberlain | 117/138.8 |
| 3,933,779 A | * | 1/1976 | Baron et al. | 260/93.5 |
| 5,622,778 A | * | 4/1997 | Horii et al. | 442/110 |
| 5,855,624 A | * | 1/1999 | Fujitani et al. | 422/93 |
| 5,956,819 A | * | 9/1999 | Terasaki et al. | 24/432 |
| 6,035,497 A | * | 3/2000 | Jackson | 24/429 |
| 6,112,375 A | * | 9/2000 | Yuki et al. | 24/418 |
| 6,156,681 A | * | 12/2000 | Tamaru et al. | 442/383 |
| 6,376,455 B1 | * | 4/2002 | Friedli et al. | 510/515 |
| 6,516,943 B2 | * | 2/2003 | Engle et al. | 24/38 |

* cited by examiner

*Primary Examiner*—Victor Sakran
(74) *Attorney, Agent, or Firm*—Finnegan, Henderson, Farabow, Garrett & Dunner, L.L.P.

(57) ABSTRACT

Antistatic agent for external use is attached to a synthetic resin material by coating or spraying, which is used in an attachment for clothes and belongings, such as a slide fastener, a button, a snap button, a hook, a strap fastener, a buckle, a swivel hook, a belt adjuster, a strap for portable goods and the like, or a component of the attachment. Alternatively, antistatic agent for internal use may be mixed in the synthetic resin material. Consequently, the attachment is provided with antistatic function, so that static electricity is discharged easily even if such an attachment is worn by a human body, thereby protecting a human body from electric shock.

7 Claims, 10 Drawing Sheets

SYNTHETIC RESIN ATTACHMENT FOR CLOTHES AND BELONGINGS

BACKGROUND OF THE INVENTION

1. Field of the Invention

The present invention relates to prevention of electrification of a synthetic resin attachment for clothes and belongings, such as a slide fastener, a button, a snap button, a hook, a strap fastener, a buckle, a swivel hook, a belt adjuster and a strap for portable goods.

2. Description of the Related Art

In recent years, synthetic resin products such as a slide fastener, a button, a snap button, a hook, a strap fastener, a buckle, a swivel hook, a belt adjuster and a strap for portable goods have been practically used in various kinds of fields. These synthetic resin products are employed as an attachment for clothes or belongings in great quantity, for example, in clothes, a hat, gloves, shoes, a case, a bag, and a portable phone.

In the meantime, since these synthetic resin products are electric insulator, they cannot release static electricity generated by friction caused upon engagement/disengagement operation of the product or due to contact with the other articles through discharge during use of clothes or belongings, so that the static electricity is likely to be charged in these synthetic resin products. Particularly in dry winter season, discharge of static electricity charged in a synthetic resin product is not achieved sufficiently. As a result, if a person touches such metallic products as a door knob, a hand rail, a vehicle door and the like while wearing electrically charged synthetic resin product or touches the electrically charged synthetic resin product while wearing such a metallic product as a ring, a watch or the like, static electricity discharge is generated, so that a human body may receive electric shock.

As means for solving this problem, Japanese Utility Model No. 3072667 has been proposed. According to the proposed means, in order to protect clothes, belongings, mainly a jumper, a case and a bag, from being charged with static electricity, a braid produced by combining electrical controlling yarns is attached to a hole by inserting therein, the hole provided in a pull of a slider in a slide fastener disposed on products such as clothes. Then, ends of the braid are overlaid and fixed so as to form a antistatic strap. Static electricity trouble on clothes is eliminated with this strap being disposed.

For employing the antistatic strap produced by combining the electrical controlling yarns in the slide fastener, it is required that a hole is provided in the pull in order to attach and fix the antistatic strap to the pull of the slide fastener, so that some restriction is applied to the configuration of the pull. Further, there is a problem that the braid may be cut out or damaged by repeated use so that it cannot achieve its object for prevention of electrification, because the braid has a poor durability.

SUMMARY OF THE INVENTION

The invention has been achieved in views of the above described problem. A main object of the invention is to provide a synthetic resin attachment for clothes and belongings, which is made of synthetic resin material containing some antistatic agent, so that the attachment is provided with antistatic function. Alternatively, a synthetic resin attachment may be provided in which a surface of the synthetic resin attachment is provided with an antistatic function by using antistatic agent for external use or the surface and inside of the synthetic resin attachment is provided with an antistatic function by using antistatic agent for internal use. In addition, a slide fastener, a button, a snap button, a hook, a strap fastener, a buckle, a swivel hook, a belt adjuster, a strap for portable goods and parts thereof, each of which is used as a synthetic resin attachment for clothes and belongings, and component parts made of synthetic resin in the slide fastener may be made of synthetic resin containing antistatic agent, so that these synthetic resin attachments are provided with an antistatic function. Furthermore, it is possible to provide a synthetic resin attachment for cloths and belongings wherein no restriction is applied to the configuration of the attachment, static electricity is securely discharged and human body is protected from electric shock.

DESCRIPTION OF THE PREFERRED EMBODIMENTS

Hereinafter, the preferred embodiments of a synthetic resin attachment for clothes and belongings of the invention will be described concretely with reference to the accompanying drawings.

Articles for use as the synthetic resin attachment for clothes and belongings of the invention include a slide fastener 1, a button 2, a snap button 3, a hook 4, a strap fastener 5, a buckle 6, a swivel hook 7, a belt adjuster 8, a strap for portable goods 9 and the like.

In order to provide the above mentioned synthetic resin attachment with an antistatic function is achieved by disposing antistatic agent for external use or internal use to a synthetic resin material which is a material composing the attachment.

The antistatic agent for external use includes cation, amphoteric surfactant and the like, which are attached to the synthetic resin material by coating or spraying in order to cover a surface of the attachment. The antistatic agent for external use absorbs water content in the air on the surface of the synthetic resin attachment to discharge static electricity to the air quickly.

The antistatic agent for internal use is divided into low-molecular antistatic agent and high-molecular antistatic agent. Upon molding, the agent is mixed and agitated in synthetic resin material, so that it is spread on the surface and inside of the attachment. Like the antistatic agent for external use, the antistatic agent for internal use absorbs water content on the surface of the synthetic resin attachment so as to discharge static electricity.

The aforementioned low-molecular antistatic agent is antistatic agent composed of surfactant of low-molecular compound and includes glycyl fatty ester, polyoxyethylene alkyl ether, polyoxyethylene alkylamine and the like, and if it is mixed into the synthetic resin attachment at 0.2 to 2 mass %, more excellent antistatic function can be exerted.

The aforementioned high-molecular antistatic agent is antistatic agent composed of a high-molecular compound in which conductive unit is incorporated in each molecule thereof and includes polyethylene oxide, poly ether ester amide, poly ether amide imide and the like. By mixing each thereof into the synthetic resin attachment at 5 to 20 mass %, excellent antistatic function can be exerted.

Figure 1:
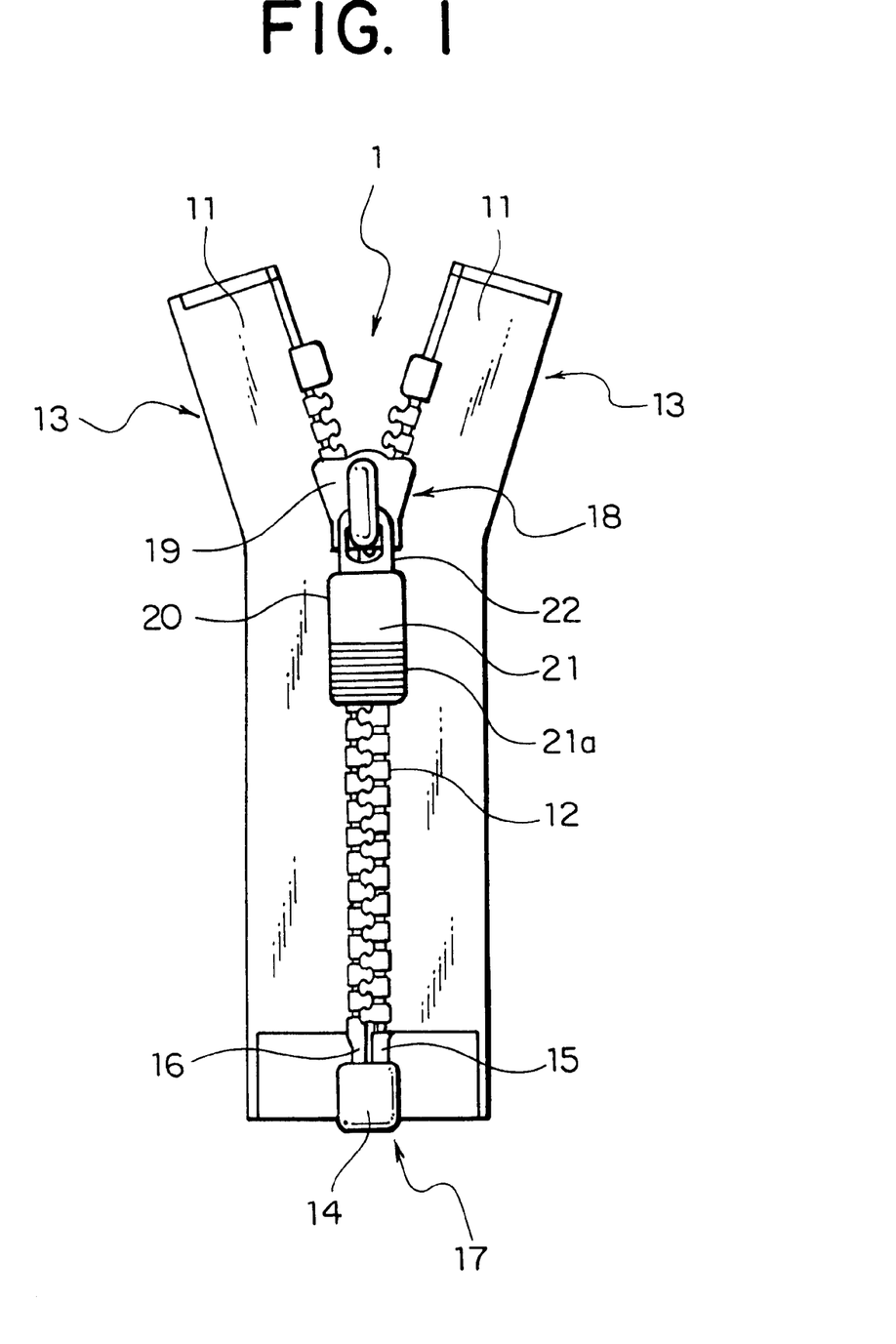
FIG. 1 is a front view of a slide fastener as an attachment.

In a slide fastener 1 shown in FIG. 1, a fastener element row 12 is attached to a side edge of a narrow fastener tape 11, which is knitted or woven from synthetic fiber such as polyamide, polyester or the like so as to form a fastener stringer 13. The fastener element row 12 is formed by arranging a multiplicity of fastener elements 12, each of which is a single unit injection-molded with synthetic resin such as polyamide, polyacetal, polypropylene, polybutylene terephthalate or the like, at a constant interval. Then, a releasable bottom end stop 17 comprised of a box 14, a box pin 15 and a separable pin 16 all formed of synthetic resin like the fastener elements 12 is attached to an end of a pair of fastener stringers 13. Further, a slider 18 for coupling or separating right and left fastener elements 12 is provided on the pair of fastener stringers 13.

Figure 2:
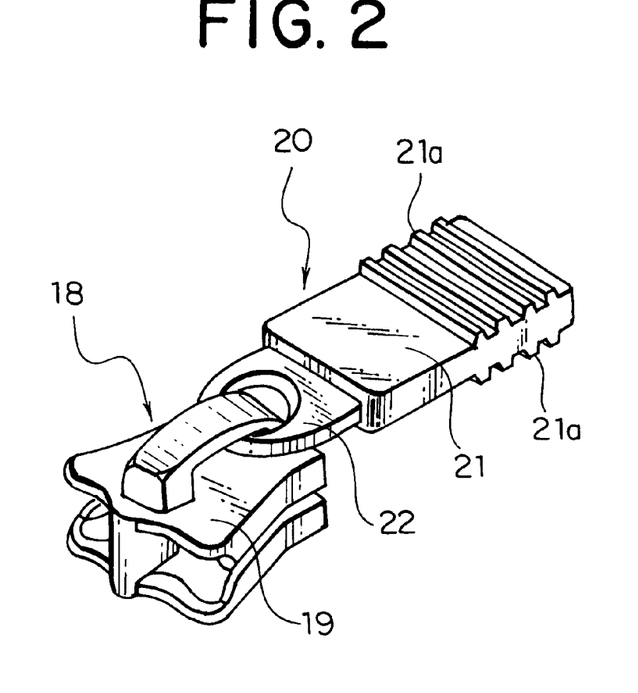
FIG. 2 is a perspective view of a slider of the slider fastener of FIG. 1.

The slider 18 is comprised of a body 19 and a pull 20 as shown in FIG. 2 and this body 19 is molded of such synthetic resin as polyamide, polyacetal, polypropylene, polybutylene terephalate or formed by die-cast molding with aluminum alloy or zinc alloy. The pull 20 is attacheded on the body 19 of the slider 18 and has a metallic connecting portion 22 at an end thereof while a grip portion 21 is formed with the aforementioned synthetic resin at the other end. Alternatively, the connecting portion 22 and the grip portion 21 are integral-molded of the aforementioned synthetic resin. An unevenness portion 21a is formed on front and rear surfaces of the grip portion 21 of the pull 20.

In the meantime, the fastener element 12 may be linear fastener element obtained by molding monofilament such as polyamide and polyester into coil and the linear fastener element 12 may be attached to the side edge of the fastener tape by sewing and the like so as to form a fastener stringer.

To provide the slide fastener 1 with the antistatic function, the antistatic agent for external use is coated or sprayed on the surface of a produced slide fastener 1. If the fastener element 12, the fastener tape 11, the releasable bottom end stop 17, the body 19 of the slider 18, the grip portion 21 of the pull 20 or the like, each made of synthetic resin, is molded with synthetic resin material including the antistatic agent for internal use, the antistatic function is provided in a product molded of the same synthetic resin or the surface and inside of the product.

If the slide fastener 1 having such antistatic function is employed in clothes or belongings, such as clothes, a case and a bag, static electricity generated when the slide fastener 1 is opened or closed or it comes into contact with other objects is discharged into the air without being charged in the slide fastener 1. Therefore, when a person touches the slide fastener 1, the person never feels electric shock or no dust is collected to the slide fastener 1.

The slider 18, particularly the pull 20 of the slide fastener 1 is preferred to be provided with the antistatic function. Because when opening/closing the slide fastener 1, the pull 20 is gripped with the fingers to move the slider 18, the pull 20 always contacts a human body when the slide fastener 1 is opened/closed. Because the pull 20 has the antistatic function, the human body never receives the electric shock when the slide fastener 1 is opened/closed. Further, because the unevenness portion 21a is formed on the front and rear surfaces of the grip portion 21 of the pull 20, the surface area of the pull increases so as to facilitate discharge of static electricity into the air.

Figure 3:
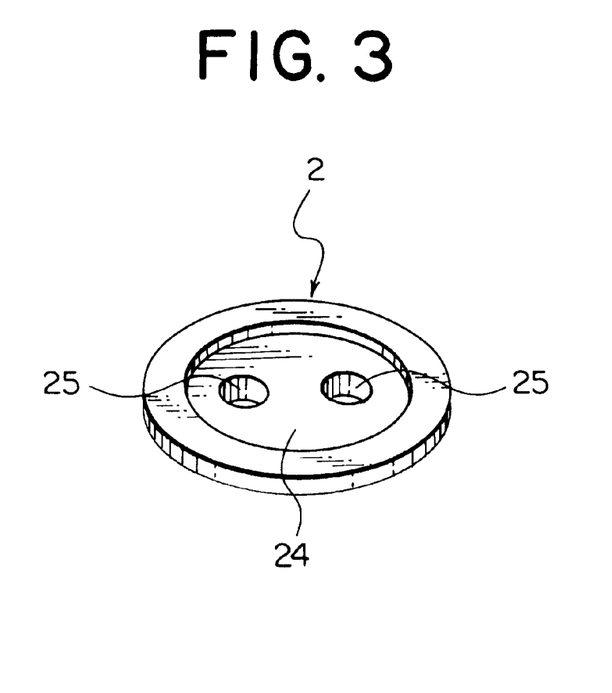
FIG. 3 is a perspective view of a button as an attachment.

In the button 2 shown in FIG. 3, a button main body 24 is molded of the aforementioned synthetic resin and string holes 25 for sewing are provided in the button main body 24. In this case, if the button main body 24 is molded of synthetic resin material with mixing the antistatic agent for internal use therein, the button main body 24 can be provided with the antistatic function. In the meantime, configuration of the button 2 is not restricted to this embodiment.

Figure 4:
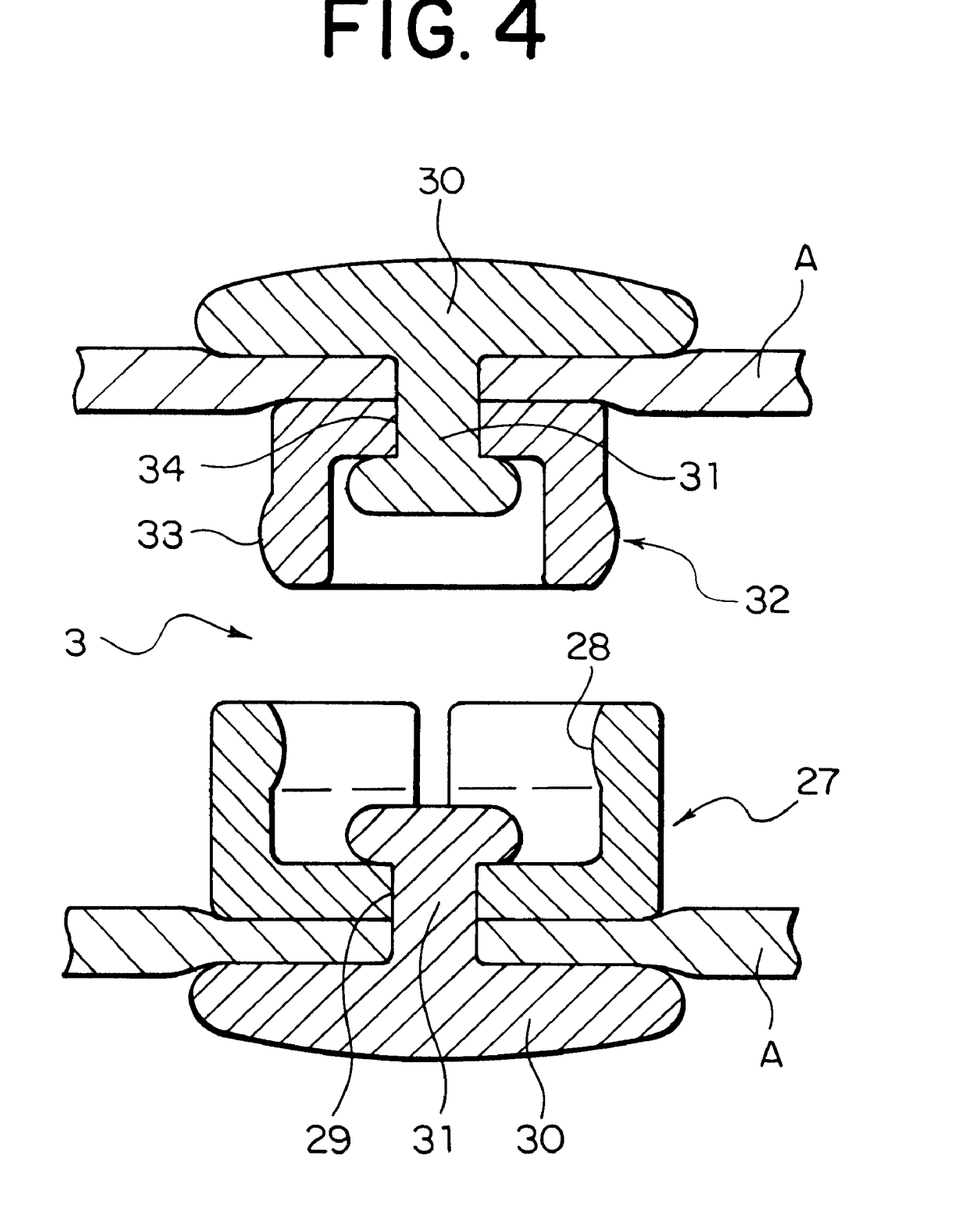
FIG. 4 is a sectional view of a snap button as an attachment.

The snap button 3 shown in FIG. 4 is composed of a snap female body 27 and a disc-like surface plate 30 for attaching the snap female body 27 to a cloth A, and a snap male body 32 having an engagement portion 33 on a cylindrical outer surface thereof and a disc-like surface plate 30 for attaching the snap male body 32 to the cloth A.

When the snap female body 27 is attached on the cloth A, the leg portion 31 provided protrudedly in the center of the surface plate 30 is pierced into the cloth A, it is fitted in the through hole 29 provided in the center of a snap female body 27 and a front end of the leg portion 31 is crushed so as to attach the snap female body 27 onto the cloth A. On the other hand, when the snap male body 32 is attached on the cloth A, after a leg portion 31 provided protrudedly in the center of the surface plate 30 is pierced into the cloth A, it is fit into a through hole 34 and its front end is crushed so as to attach the snap male body 32 onto the cloth A. Then, the snap male body 32 is fit into the snap female body 27 so as to engage the engaging portion 28 with the engaging portion 33. The snap female body 27, the snap male body 32 and the surface plate 30 are molded using the aforementioned synthetic resin material and the antistatic agent for internal use is mixed into this synthetic resin material prior to the molding, so as to provide the snap button 3 with an antistatic function. In the meantime, the configuration of the snap button 3 is not restricted to that of this embodiment.

Figure 5:
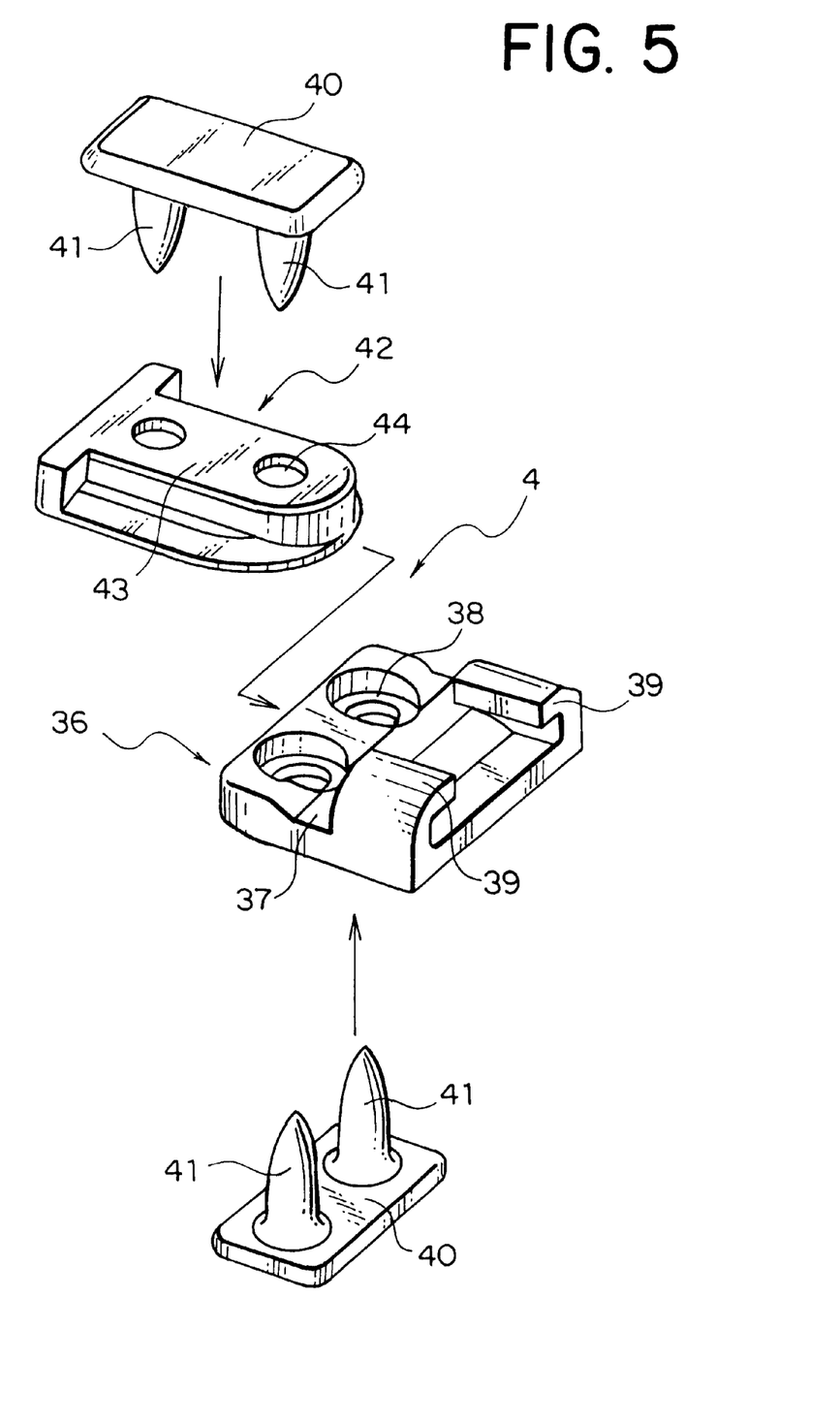
FIG. 5 is an exploded perspective view of a hook as an attachment.

The hook 4 shown in FIG. 5 is composed of a female member 36 and a male member 42. In the female member 36, attaching holes 38 are provided in an end of a flat substrate 37 and hook-like holding pieces 39 are provided at the other end, in which the male member 42 is hooked, such that they oppose each other from both sides. Attaching posts 41 are provided protrudedly on a face of a back plate 40 so that they can be inserted into the attaching holes 38. In the male member 42, both sides thereof are cut out longer than those of the female member 36 so as to provide a substrate 43 which allows itself to be inserted between the holding pieces 39. Then, this substrate 43 is provided with attaching holes 44, so that the attaching posts 41 on the back plate 40 can be inserted therein.

Upon attaching the female member 36 to a cloth, the substrate 37 of the female member 36 is placed on a face of the cloth and then, the attaching posts 41 of the back plate 40 are pierced into the cloth from the rear side of the cloth. After that, the attaching posts 41 are inserted into the attaching holes 38 and front ends thereof are crushed to fix. In case of the male member 42, the substrate 43 is also placed on a face of the other cloth and the attaching posts 41 of the back plate 40 are pierced into the cloth from the rear side of the same cloth. After that, the attaching posts 41 are inserted into the attaching holes 44 and front ends thereof are crushed to fix. Then, the substrate 43 of the male member 42 is inserted in between the holding pieces 39 of the female member 36 so that it is hooked.

The female member 36, the male member 42 and the back plate 40 are molded integrally from the aforementioned synthetic resin material and the antistatic agent for internal use is mixed in this synthetic resin material prior to the molding. Consequently, the hook 4 comprised of the female member 36 and the male member 42 is provided with the antistatic function. In the meantime, the configuration of the hook 4 is not restricted to that of this embodiment.

Figure 6:
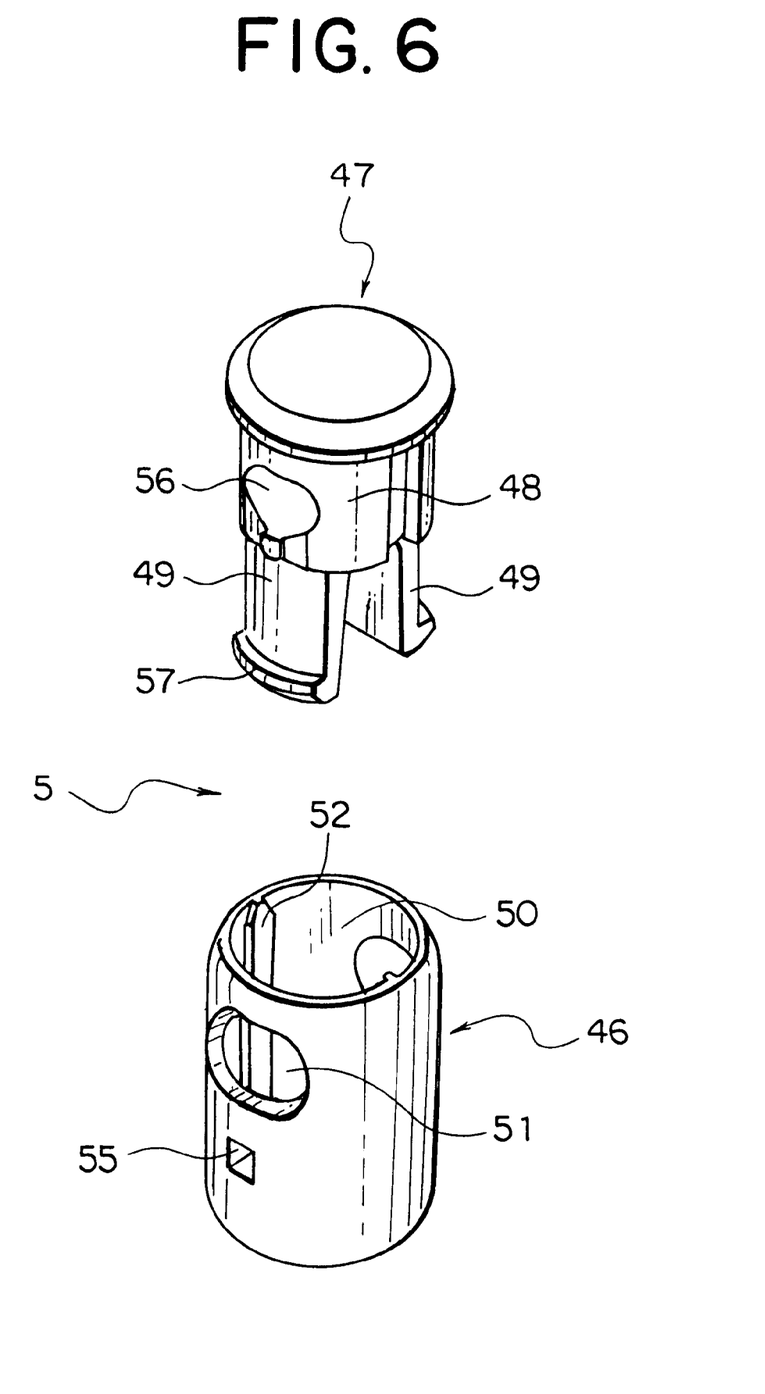
FIG. 6 is an exploded perspective view of a strap fastener as an attachment.
Figure 7:
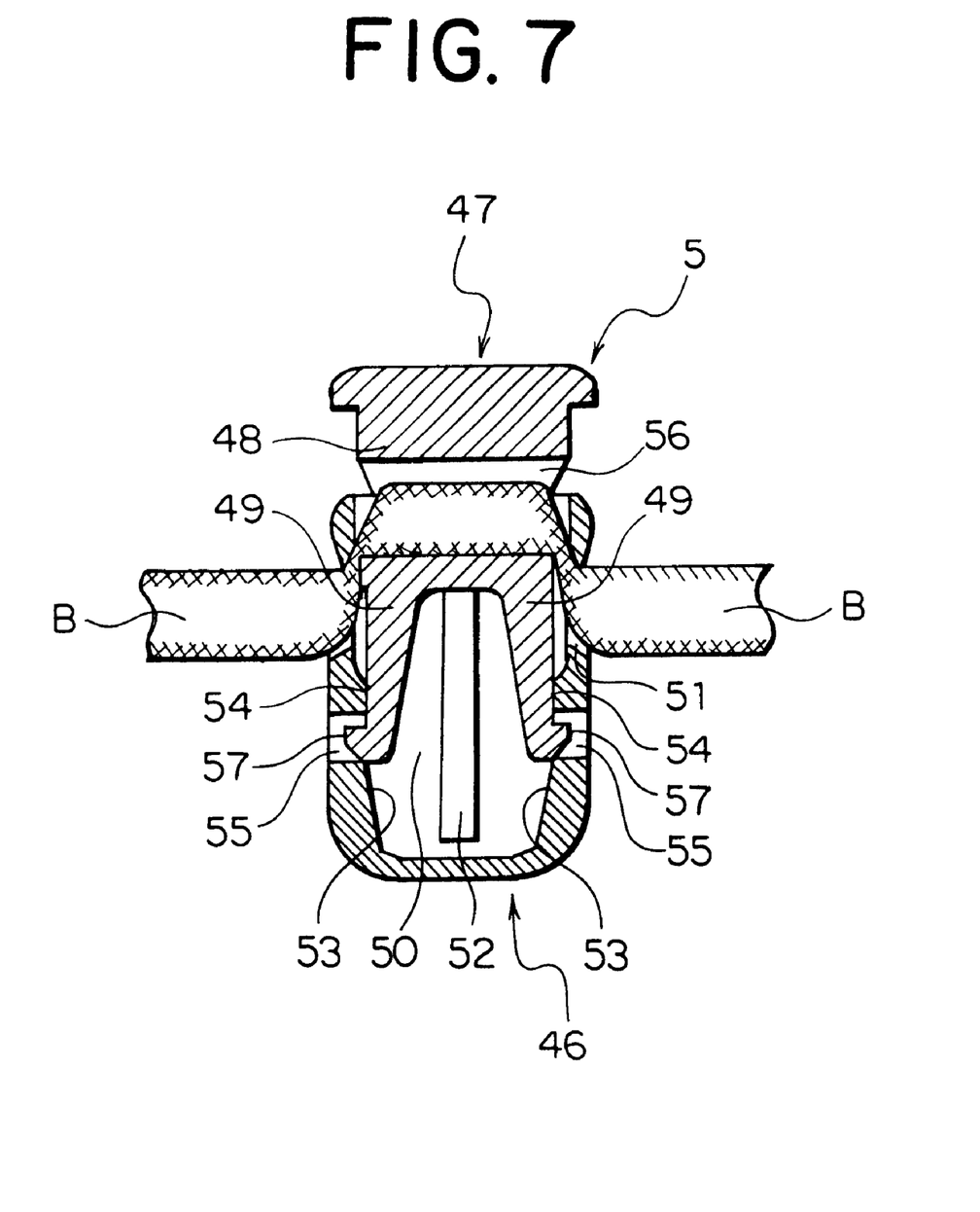
FIG. 7 is a sectional view showing an engagement state of the strap fastener of FIG. 6.

The strap fastener 5 shown in FIGS. 6 and 7 is comprised of a cylindrical main body 46 having a bottom and a sliding body 47 having a pair of elastic leg portions 49, which are elastically deformable, below a cylindrical body portion 48. The main body 46 contains an accommodating portion 50 capable of fitting the sliding body 47 in the center thereof and a strap insertion hole 51 through which a strap B can be inserted is provided in an upper portion of the side wall of the accommodating portion 50. Further, an inclined flat cam face 53 is formed on an inner face below the strap insertion hole 51. A protrusion 54 is provided above the cam face 53, while a blocking hole 55 is provided under the protrusion 54.

The body portion 48 of the sliding body 47 contains a strap insertion hole 56, which opposes the strap insertion hole 51 in the main body 46, allowing the strap B to be inserted through. An elastic leg portion 49 is provided below the strap insertion hole 56 and edge portion 57 protruded outward is formed at an end of the leg portion 49, the edge portion 57 making a sliding contact with the cam face 53 of the main body 46. Part of the edge portion 57 is fitted into the blocking hole 55 of the main body 46, so that the sliding body 47 is prevented from escaping from the main body 46.

As shown in FIG. 7, the sliding body 47 and the main body 46 form a fastening device for nipping and adjusting the strap B. In a state that the sliding body 47 is fitted and pressed into the main body 46 and the strap insertion hole 51 coincides with the strap insertion hole 56, the strap B is inserted. Then, if the pressing force is released, the sliding body 47 is pushed upward by the elastic leg portion 49 and the cam face 53, so that the strap B is nipped.

The main body 46 and the sliding body 47 of the strap fastener 5 are integrally molded using the aforementioned synthetic resin material and prior to the molding, antistatic agent for internal use is mixed in the synthetic resin material so as to provide the main body 46 and the sliding body 47 with the antistatic function. In the meantime, the configuration of the strap fastener 5 is not restricted to that of this embodiment.

Figure 8:
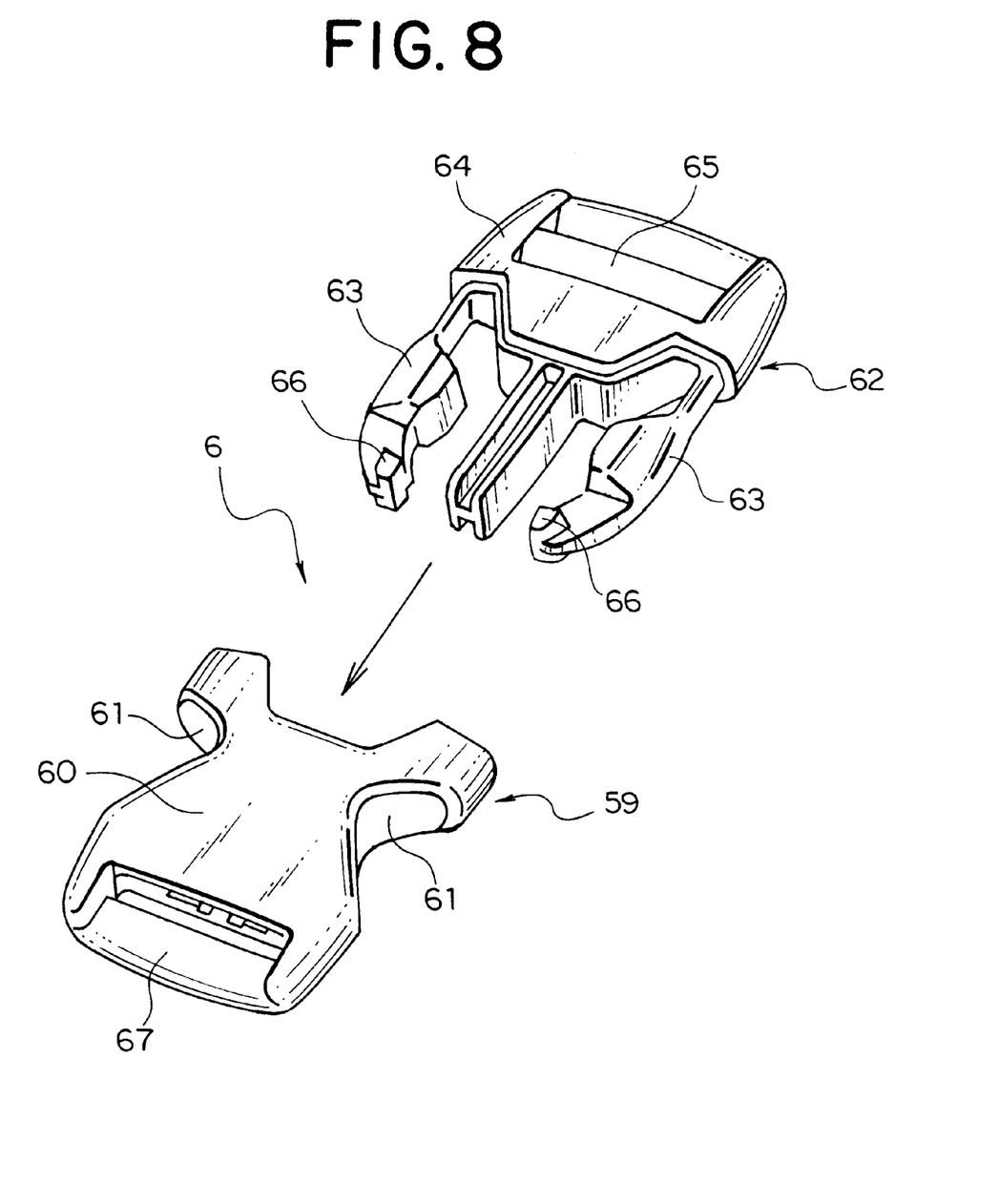
FIG. 8 is a perspective view of a buckle as an attachment.

The buckle 6 shown in FIG. 8 is formed from a flat cylindrical housing 60 and comprised of a female body 59 having cut-outs 61 on both sides and a male body 62 in which a pair of flexible insertion leg portions 63 are provided such that they are protruded from a frame body 64 having a belt adjuster 65. The pair of insertion leg portions 63 of the male body 62 are inserted into the housing 60 in the female body 59, so that engaging protrusions 66 protruded vertically at front ends of the leg portions 63 engage engaging protrusions (not shown) provided on an inner face of the housing 60. Thus, the female body 59 and the male body 62 are connected with each other.

To release the engagement, the insertion leg portions 63 exposed from the cut-outs 61 of the housing 60 are pressed inward. An end of a belt is attached to an attaching member 67 provided on an end of the housing 60 and the other end of the belt is inserted through the belt adjustment portion 65 provided in the frame body 64 and after that, the length of the belt is adjusted.

The female body 59 and the male body 62 are integrally molded using the aforementioned synthetic resin material. The antistatic agent for internal use is mixed in synthetic resin material prior to the molding so as to provide the female body 59 and the male body 62 with an antistatic function. In the meantime, the configuration of the buckle 6 is not restricted to that of this embodiment.

Figure 9:
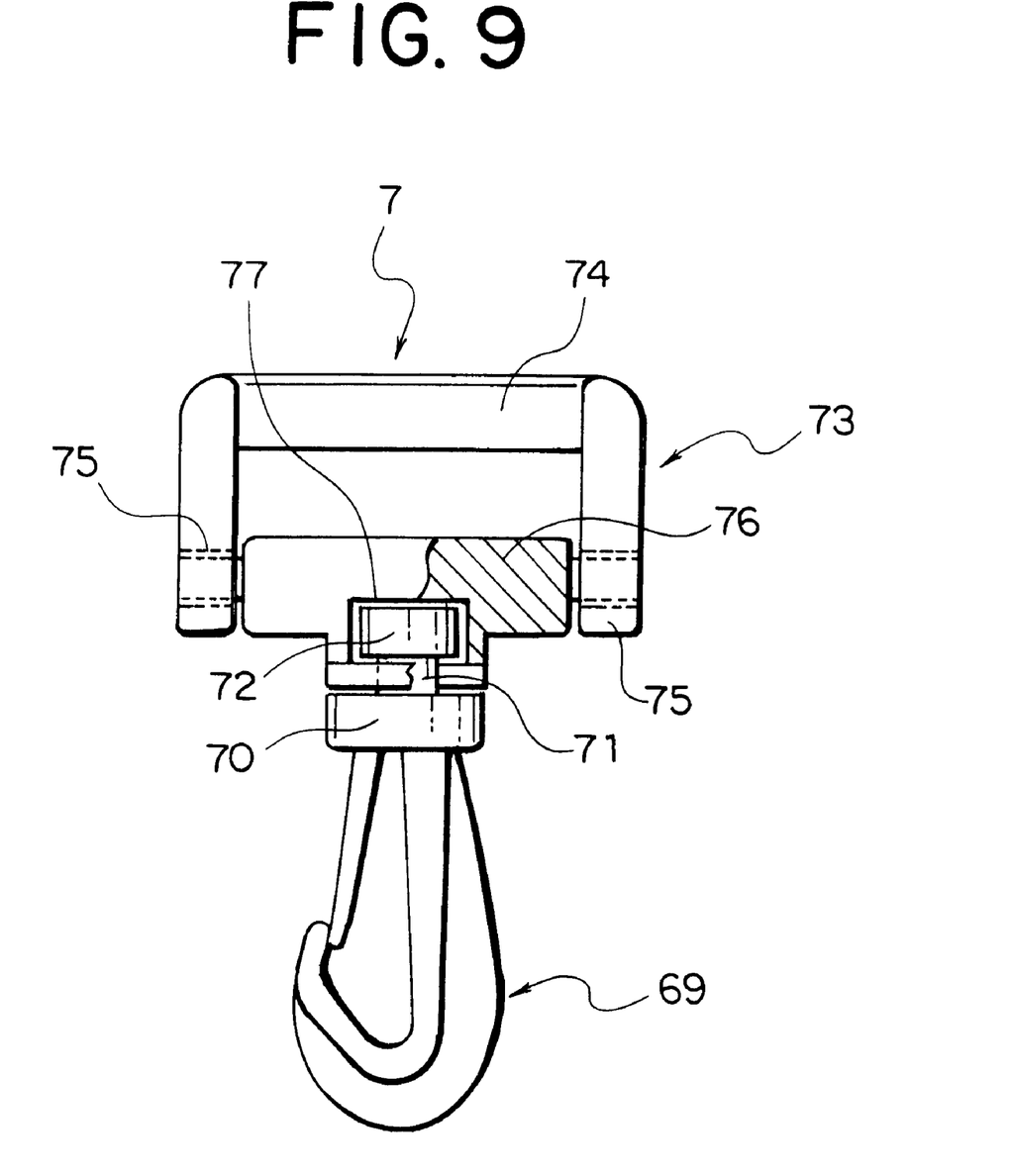
FIG. 9 is a front view of a swivel hook as an attachment with part thereof cut out.

In the swivel hook 7 shown in FIG. 9, a round rod-like neck portion 71 is provided protrudedly on a cylindrical proximal portion 70 of a hook-like engaging member 69 and a small disc-like head portion 72 is provided at a front end of the neck portion 71. On the other hand, a belt-attaching member 73 is formed from a turned U-shaped frame body 74 and shaft holes 75 are provided in both ends of the frame body 74. A shaft portion 76 having a pivot on each of both ends is supported by the shaft holes 75 and an accommodating portion 77 capable of accommodating the head portion 72 of the engaging member 69 is provided in the center of this shaft portion 76. The accommodating portion 77 supports the engaging member 69 freely rotatably.

In this swivel hook 7, a belt is attached to the belt attaching portion 73 formed from the turned U-shaped frame body 74 and various kinds of hooking members are hooked by the engaging member 69. This swivel hook 7 is integrally molded using the aforementioned synthetic resin material in a state that the belt attaching member 73 and the engaging member 69 are connected with each other. The antistatic agent for internal use is mixed in the synthetic resin material prior to the molding so as to provide the swivel hook 7 with an antistatic function. In the meantime, the configuration of the swivel hook 7 is not restricted to that of this embodiment.

Figure 10:
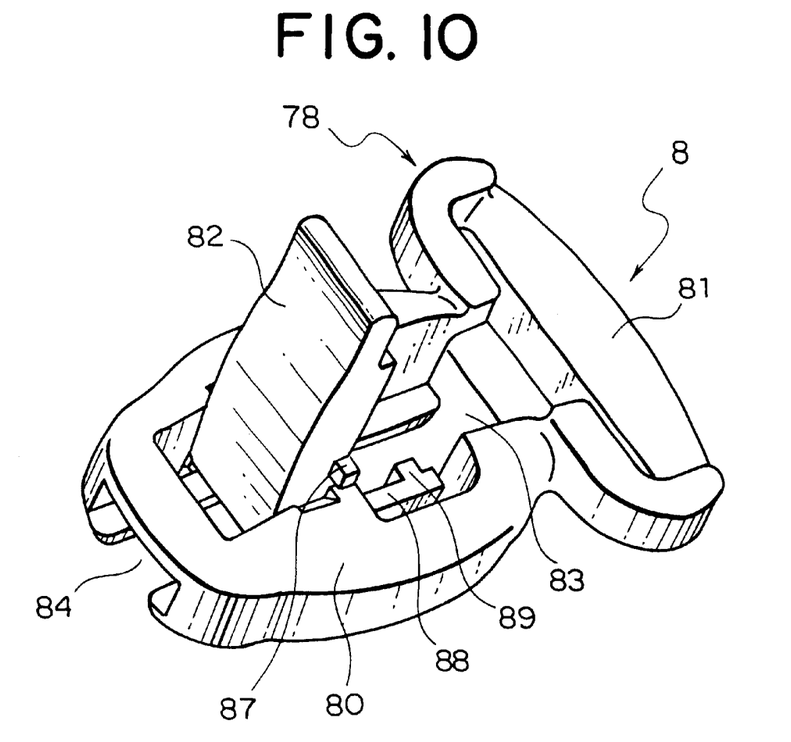
FIG. 10 is a perspective view of a belt adjuster as an attachment.
Figure 11:
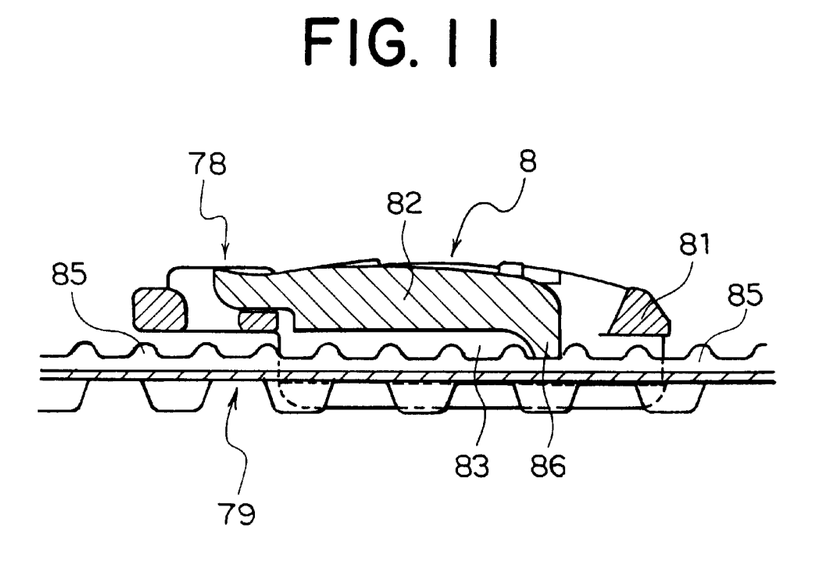
FIG. 11 is a sectional view showing a use condition of the belt adjuster of FIG. 10.
Figure 12:
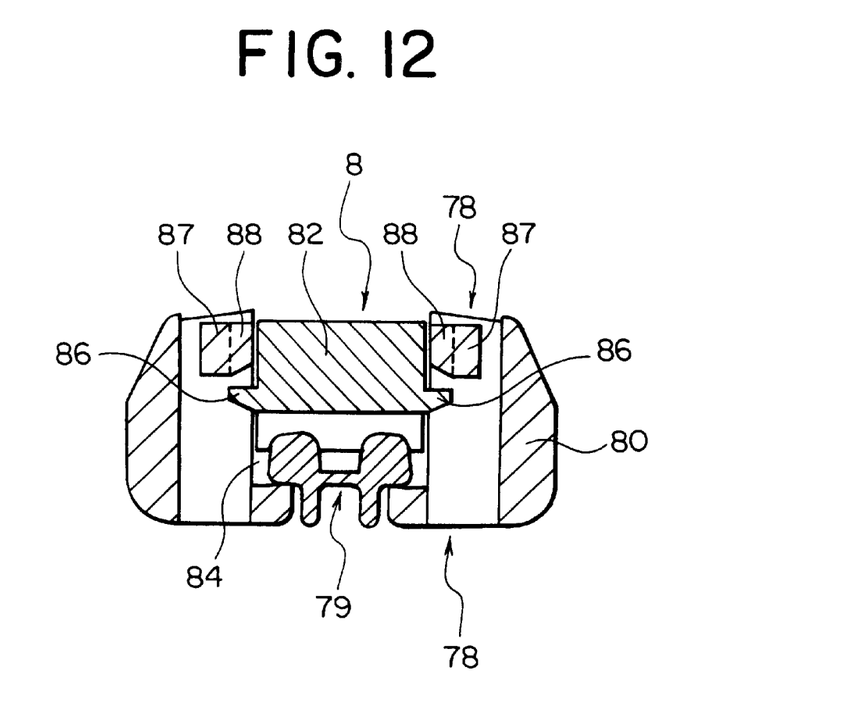
FIG. 12 is a sectional view showing a use condition of the belt adjuster of FIG. 10.

The belt adjuster 8 shown in FIGS. 10 to 12 is comprised of a slider 78 and an adjusting belt 79. An attaching portion 81, to which a belt fixed to a waist belt is to be attached, is provided on an end of a main body 80 of the slider 78 and an operating lever 82 is supported freely rotatably by the other end of the main body. An accommodating groove 83 capable of accommodating the operating lever 82 is provided in a center of a surface of the main body 80 and a guide groove 84 is provided in the rear surface so that the adjusting belt 79 can be fitted thereto and slides there.

An engaging pawl 86 capable of engaging engagement teeth 85 on the adjusting belt 79 is formed at a front end of the operating lever 82. Engaging protrusions 87 are provided on both side faces of the operating lever 82, such that the engaging protrusions 87 are capable of protruding portions 89 on flexible engaging leg pieces 88 provided on both side faces of the accommodating groove 83 in the main body 80. If the operating lever 82 is fallen, the engaging protrusions 87 make a contact with the protruding portions 89 so as to retreat the engaging leg pieces 88. When the engaging leg pieces 88 are elastically restored to their original positions, engagement between the engagement teeth 85 and the engaging pawl 86 is maintained. If the operating lever 82 is raised, the engagement between the engagement teeth 85 and the engaging pawl 86 is released, so that the slider 78 can be moved freely on the adjusting belt 79 so as to enable adjustment of the tightening.

The slider 78 of the belt adjuster 8 is at least molded using the aforementioned synthetic resin material. The antistatic agent for internal use is mixed in the synthetic resin material prior to the molding so as to provide the belt adjuster 8 with an antistatic function. Further, the adjusting belt 79 can be provided with an antistatic function also by molding it with mixing the antistatic agent for internal use into the synthetic resin material. In the meantime, the configuration of the belt adjuster 8 is not restricted to that of this embodiment.

Figure 13:
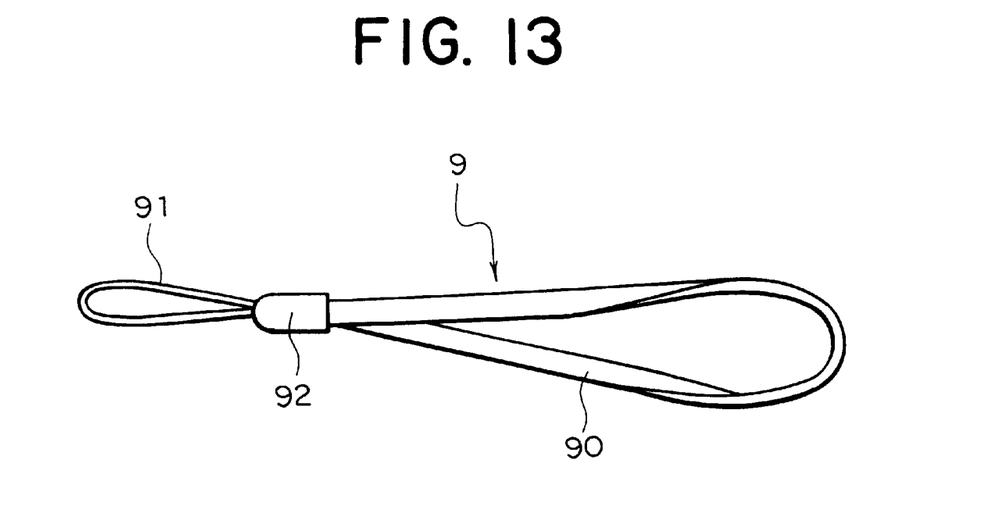
FIG. 13 is a front view of a strap for portable goods as an attachment.

In the strap for portable goods 9 shown in FIG. 13, each of various kinds of straps 90 is wound in a shape of a loop and then, a narrow strap 91 is also wound in the shape of a loop and a connecting body 92 molded from synthetic resin material is attached to a connecting portion of the strap 90 and the narrow strap 91. When this connecting body 92 is integrally molded using the aforementioned synthetic resin material, the antistatic agent for internal use is mixed prior to the molding so as to provide the connecting body with the antistatic function. Further, the strap 90 may be formed of synthetic fiber, so that it is provided with the antistatic function by coating or spraying the surface thereof with the antistatic agent for external use. This strap for portable goods 9 is employed for the pull of a slider in the slide fastener, or portable phone or portable radio.

Although all components composing the attachment are provided with the antistatic function according to the embodiments shown in FIGS. 4 to 13, it is permissible to provide only a component with the antistatic function.

It is clear form the above description, following effects are achieved according to the invention.

Because antistatic agent is disposed in synthetic resin material constituting the attachment so as to provide the attachment with the antistatic function, no electric shock is received even if the synthetic resin attachment is always worn. Therefore, there is such an effect that the attachment is used with safety.

Further, the surface of an attachment is coated or sprayed with antistatic agent so as to provide the attachment with the antistatic function. Consequently, there is such an effect that the antistatic function can be provided quickly with a very simple means.

Further, antistatic agent is mixed in synthetic resin material of the attachment so as to provide the attachment with the antistatic function. Consequently, because antistatic agent exists inside as well as on the surface, even if the antistatic agent is removed from the surface by washing or friction, antistatic agent existing inside is transferred to the surface. Thus, there is such an effect of obtaining an attachment which maintain antistatic function forever.

Furthermore, synthetic resin material of such attachment as a slide fastener, a button, a snap button, a hook, a strap fastener, a buckle, a swivel hook, a belt adjuster, a strap for portable goods and the like and parts constituting the attachment are provided with the antistatic function. Consequently, there is such an effect that various kinds of attachments used for clothes and belongings can be provided with the antistatic function easily.

In addition, a slide fastener is comprised of a pair of fastener stringers in which a fastener element row is attached to a side edge of a fastener tape thereof and a slider for coupling or separating fastener elements, and a body and/or a pull of the slider made of synthetic resin and further, each of the synthetic resin fastener element and synthetic fiber fastener tape may be provided with the antistatic function. Consequently, there is such an effect that components made of synthetic resin in the slide fastener used in clothes and belongings can be provided with the antistatic function easily and effectively. As mentioned above, the effects according to the invention are extremely remarkable.

Description of Reference Numerals

1 slide fastener
2 button
3 snap button
4 hook
5 strap fastener
6 buckle
7 swivel hook
8 belt adjuster
9 strap for portable goods
11 fastener tape
12 fastener element
13 fastener stringer
18 slider
19 body
20 pull

What is claimed is:

1. A synthetic resin attachment for clothes and belongings, wherein antistatic agent is disposed in synthetic resin material constituting the attachment so as to provide the synthetic resin attachment with an antistatic function, wherein the synthetic resin attachment comprises at least one of a slide fastener, a button, a snap button a hook, a strap fastener, a buckle, a swivel hook, a belt adjuster, and a strap for portable goods.

2. A synthetic resin attachment for clothes and belonging according to claim 1, wherein a surface of the synthetic resin material of the attachment is coated or sprayed with the antistatic agent so as to provide the attachment with an antistatic function.

3. A synthetic resin attachment for clothes and belongings according to claim 1, wherein the antistatic agent is mixed in the synthetic resin material of the attachment so as to provide the attachment with an antistatic function.

4. A synthetic resin attachment for clothes and belongings according to claim 1, wherein the synthetic resin material of a component constituting the attachment is provided with an antistatic function.

5. A synthetic resin attachment for clothes and belongings according to claim 1, wherein a slide fastener comprises a pair of fastener stringers, in which fastener elements are attached to a side edge of fastener tape thereof, and a slider for coupling and separating the fastener elements, and at least one of a body and a pull of said slider is made of synthetic resin and provided with an antistatic function.

6. A synthetic resin attachment for clothes and belongings according to claim 5, wherein the fastener elements made of the synthetic resin are provided with an antistatic function.

7. A synthetic resin attachment for clothes and belongings according to claim 5, wherein a fastener tape made of synthetic fiber is provided with an antistatic function.

* * * * *

UNITED STATES PATENT AND TRADEMARK OFFICE
CERTIFICATE OF CORRECTION

PATENT NO.    : 6,654,989 B2
DATED         : December 2, 2003
INVENTOR(S)   : Noritsugu Hamai It is certified that error appears in the above-identified patent and that said Letters Patent is hereby corrected as shown below:

<u>Column 8,</u>
Line 36, "button a hook," should read -- button, a hook, --.

Signed and Sealed this

Thirteenth Day of April, 2004

JON W. DUDAS
*Acting Director of the United States Patent and Trademark Office*